Dec. 23, 1924.
G. G. BRADY
TEMPER SCREW
Filed Jan. 15, 1924
1,520,401
2 Sheets-Sheet 1
Fig. 1.
Fig. 2.
Fig. 3.
Fig. 4.
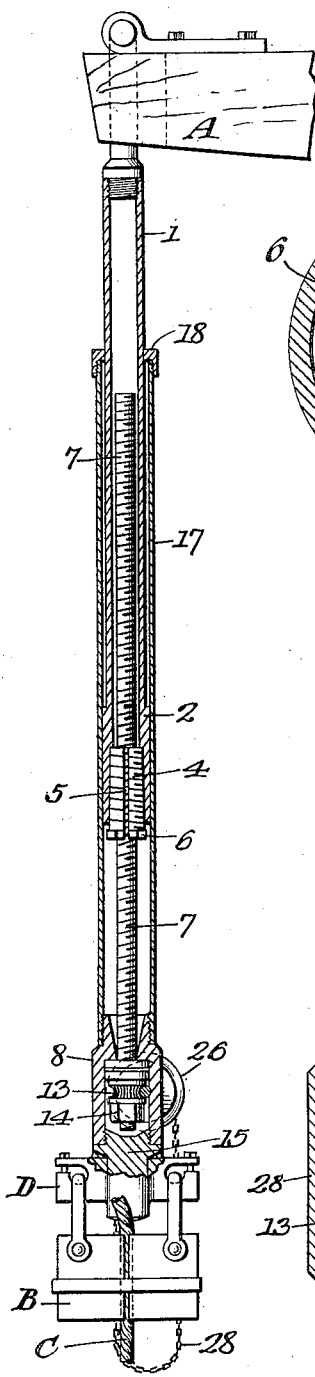
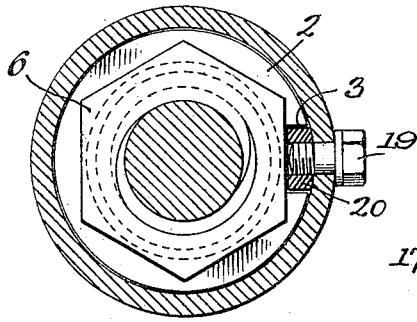
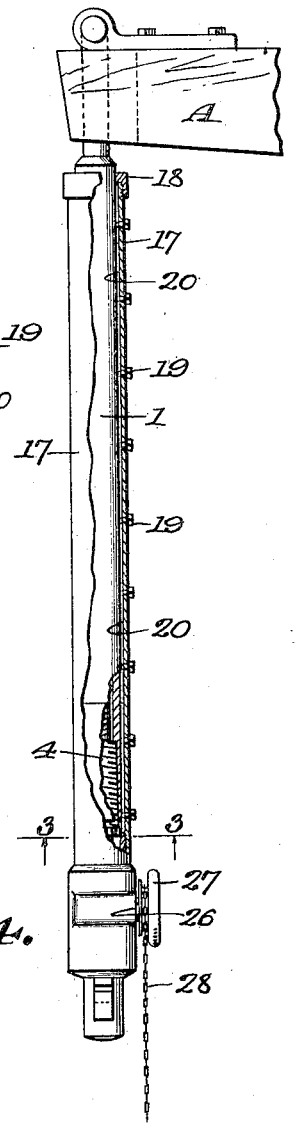
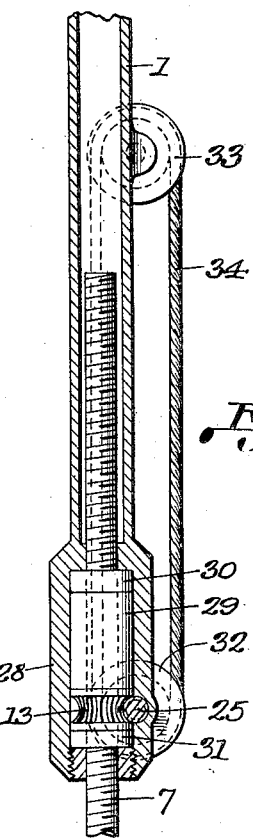
Inventor
G. G. Brady
by his Attorneys
Baldwin Wight Dec. 23, 1924. 1,520,401
G. G. BRADY
TEMPER SCREW
Filed Jan. 15, 1924 2 Sheets-Sheet 2

Inventor
G. G. Brady
by his Attorneys

Patented Dec. 23, 1924.

1,520,401

UNITED STATES PATENT OFFICE.

GURDON G. BRADY, OF ARKANSAS CITY, KANSAS.

TEMPER SCREW.

Application filed January 15, 1924. Serial No. 686,322.

*To all whom it may concern:*

Be it known that I, GURDON G. BRADY, a citizen of the United States, and resident of Arkansas City, in the county of Cowley and State of Kansas, have invented certain new and useful Improvements in Temper Screws, of which the following is a specification.

In drilling oil wells, particularly, it is necessary to have connections between the walking beam and the cable which can be extended slowly as the depth of the well increases, and such connections usually include mechanism known as a temper screw.

An object of my invention is to provide such a temper screw that will be capable of ready and accurate adjustment and will be held in desired position against any accidental movement without the necessity of any special holding means.

Another object is to provide a structure in which the screw and moving parts will be enclosed and thereby protected from sand, mud, and other substances which would tend to obstruct the operation of the parts and injure or unduly wear the same.

Another object is to provide simple means for taking up the wear between the screw and its engaging part.

Other objects will be apparent from the following detailed description and the appended claims.

In the drawings:

Figure 1 is a longitudinal section of the device constituting the subject matter of my invention with the parts partially extended.

Figure 2 is a side elevation with parts broken away and the parts in their most compact position.

Figure 3 is a cross section on the line 3—3 of Figure 2.

Figure 4 is a sectional view of a portion of a modified form.

Figures 5, 6:
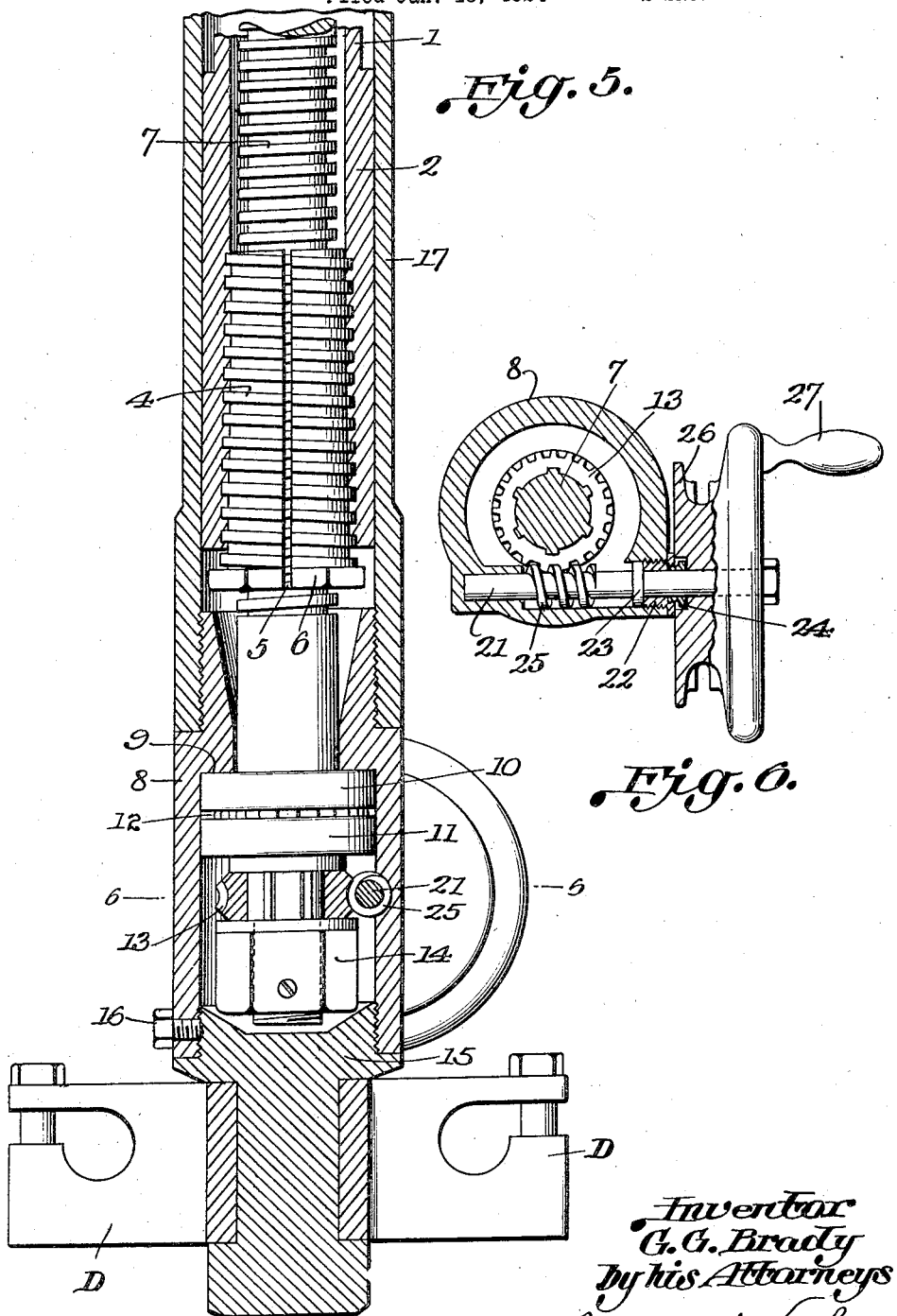
Figure 5 is a longitudinal section of the lower portion of the mechanism on an enlarged scale.
Figure 6 is a cross section on the line 6—6 of Figure 5.

The drawings disclose a portion of a walking beam A, a rope clamp B for a rope C and a swivel D to which is connected the rope clamp. These parts may be of any old or desired type and form no part of my invention and have been illustrated only conventionally.

Supported by the walking beam A is a hanger or holder 1 in the form of a tube having a thickened lower end 2 provided with an external key way 3 (see Figure 3). The lower thickened portion of the holder 1 is internally threaded and screwing thereinto is a boxing 4 which is split on one side at 5 and has preferably a weakened portion on the opposite side. It has a hexagonal or other angular lower end 6 and is internally threaded. The internal and external threads on the boxing 4 run in opposite directions.

The screw 7 passes through the boxing 4 and fits the internal threads thereof. Carried by its lower end is a casing 8 having a shoulder 9 against which fits a bearing member 10 between which and a bearing member 11 carried by the screw are antifriction members 12. Below this bearing member 11 and fast to the screw in any suitable manner is a worm gear 13 for a purpose hereinafter described. This is held in position by a nut 14 locked in any suitable manner. To the lower part of the casing 8 is attached a closure 15 which may screw into the casing and be held by a lock bolt 16. This closure supports the swivel D.

Screw threaded upon the upper end of the casing 8 is a tubular member 17 which has sliding engagement with the thickened lower end of tube 1. A cap 18 screwed upon the upper end of this tubular member also engages the outside of the tube 1 and guides the two in their telescopic movements. Fastened by bolts 19 to the member 17 is a key 20 which slides in the key way 3 in the lower end 2 of the hanger 1. The boxing 4 and the internally threaded portion of the hanger 1 are both tapered slightly so that the wear can be taken up by screwing the boxing into the member 1.

A shaft 21 has one end mounted in a bearing in the casing 8 and is supported near the other end by a screw bearing 22 threaded into an opening in the casing and against a shoulder 23 on the shaft. A suitable jam nut 24 may also be employed. The shaft 21 has a worm 25 meshing with the worm gear 13, and is also provided with a chain sprocket wheel 26 and a handle 27. An endless chain 28 passes around the sprocket wheel 26 so that the worm may be given rapid rotation by means of the chain or a slower movement by means of the handle 27.

By rotation of the worm 25 the worm gear 13 is turned and consequently the screw 7 is rotated. Since the key 20 passes down along one face of the hexagon nut 6 as clearly shown in Figure 3, the boxing cannot rotate when the screw 7 does. The opposite threading of the screws on the inside and outside of the boxing 4 also prevents the turning of the screw 7 from having any tendency to turn the boxing 4 when the former is moving in one direction. As the screw 7 is rotated, it must travel through the boxing 4 and as the outer casing or tubular member 17 is carried by the casing 8 which also carries the screw, a longitudinal movement of the screw will produce a similar movement of the member 17 and the cap 18 will slide along the outside of the hanger 1.

When it is desired to adjust the position of the boxing 4 relative to the hanger 1, the cap 18 is unscrewed and the screw 7 turned until it passes out of the boxing entirely when it and the tubular member 17, casing 8 and connected parts are all removed as a unit. The boxing 4 can then be turned through the nut 6 to any desired position and the parts replaced, it only being necessary to have one flat side of the head 6 in a position to lie parallel with the key 20.

Since all of the operative parts are enclosed they are protected from sand, dirt and any extraneous matter, and the space may be filled with a lubricant as desired. The worm gear will itself act to lock the parts in any adjusted position.

In the alternative construction disclosed in Figure 4, the hanger 1 terminates at its lower end in an enlarged portion 28 within which is a boxing 29 mounted between ball bearings 30 and 31. The worm gear 13 is carried by the boxing which rotates while the screw 7 is keyed against rotation. The worm shaft 21 carries a pulley 32 and a pulley 33 is mounted in an ear on the hanger 1. A rope 34 passes around the two pulleys and by movement of the rope the gearing may be rapidly rotated. In this form, if it is desired to provide for adjustment, the boxing 29 may be a split box surrounded by an inwardly tapered but outwardly cylindrical sleeve.

It is obvious that various detailed changes may be made without departing from the spirit of the invention which is to be regarded as limited only by the scope of the appended claims.

I claim as my invention:

1. A temper screw comprising a hanger, a boxing enclosed by said hanger, a screw passing through said boxing, a tubular casing carrying said screw and telescoping outside said hanger and means for producing relative rotation between the boxing and said screw and thereby relative longitudinal movement between the screw and the hanger.

2. A temper screw comprising a tubular hanger, a boxing adjustably threaded into the lower end of the hanger, a screw threaded into said boxing, a telescoping casing carrying said screw and telescoping outside said hanger and means for producing relative rotation between the boxing and said screw and thereby relative longitudinal movement between the screw and the hanger.

3. A temper screw comprising a tubular hanger, a split boxing threaded into the lower end of the hanger, a screw threaded into said boxing, a telescoping casing carrying said screw and telescoping outside said hanger the internal and external threads on said boxing being opposite in direction, means for producing relative rotation between the boxing and the screw and means for holding one of said parts against rotation.

4. A temper screw comprising a tubular hanger, a boxing threaded into the lower end of the hanger, a screw threaded into said boxing, means for holding the boxing in adjusted position against rotation and worm gearing for rotating the screw and thereby producing relative longitudinal movement between the screw and the hanger.

5. A temper screw comprising a tubular hanger, a boxing threaded into said hanger, a screw threaded into the boxing, a tubular member movable with said screw and enclosing the boxing and hanger, means for holding the boxing in adjusted position against rotation, and means for rotating the screw and producing relative longitudinal movement between the screw with the tubular member and the hanger.

6. A temper screw comprising a tubular hanger having a thickened lower end provided with an external key way and an internal threaded portion, a boxing threaded into said hanger and having an internal thread opposite in direction, a screw threaded into said boxing, a tubular member movable longitudinally with said screw, and a key carried by said tubular member and sliding in said key way.

7. A temper screw comprising a tubular hanger having a thickened lower end provided with an external key way and an internal threaded portion, a boxing threaded into said hanger and having an internal thread opposite in direction, a screw threaded into said boxing, a tubular member movable longitudinally with said screw, and a key carried by said tubular member and sliding in said key way, said key also engaging the head of the boxing to hold it from rotation when the parts are assembled.

8. A temper screw comprising a tubular hanger having a thickened lower end with an external keyway and a slightly tapered internally threaded portion, a split boxing threaded into said hanger and having an internal thread opposite in direction, a screw threaded into said boxing, a tubular member movable longitudinally with said screw, a key carried by said tubular member and sliding in the keyway, and means for rotating said screw.

9. A temper screw comprising a tubular hanger having a thickened lower end with an external keyway and a slightly tapered internally threaded portion, a split boxing threaded into said hanger and having an internally thread opposite in direction, a screw threaded into said boxing, a tubular member movable longitudinally with said screw, a key carried by said tubular member and sliding in the key way, and worm gearing for rotating said screw.

10. A temper screw comprising a tubular hanger having a thickened lower end and with an external keyway and a slightly tapered internally threaded portion, a split boxing threaded into said hanger and having an internal thread opposite in direction, a screw threaded in said boxing, a tubular member movable longitudinally with said screw, a key carried by said tubular member and sliding in the key way, worm gearing for rotating said screw, and means for giving rapid movement to said worm gearing.

In testimony whereof, I have hereunto subscribed my name.

GURDON G. BRADY.